US008364007B2

(12) United States Patent
Corry et al.

(10) Patent No.: US 8,364,007 B2
(45) Date of Patent: Jan. 29, 2013

(54) IMPROVING STORAGE EFFICIENCY OF HIGH DEFINITION DIGITAL VIDEO RECORDERS

(75) Inventors: Kevin M. Corry, Pflugerville, TX (US); Mark A. Peloquin, Austin, TX (US); Steven L. Pratt, Leander, TX (US); Karl M. Rister, Austin, TX (US); Andrew M. Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 977 days.

(21) Appl. No.: 12/336,160

(22) Filed: Dec. 16, 2008

(65) Prior Publication Data

US 2010/0150531 A1 Jun. 17, 2010

(51) Int. Cl.
*H04N 5/935* (2006.01)

(52) U.S. Cl. ........ 386/213; 386/232; 386/292; 386/294; 386/295

(58) Field of Classification Search .................. 386/213, 386/232, 292, 294, 295
See application file for complete search history.

(56) References Cited

U.S. PATENT DOCUMENTS

| | | | | |
|---|---|---|---|---|
| 5,650,827 | A * | 7/1997 | Tsumori et al. | 725/59 |
| 2006/0268169 | A1 | 11/2006 | Han | |
| 2008/0141303 | A1 * | 6/2008 | Walker et al. | 725/39 |
| 2009/0138385 | A1 * | 5/2009 | Harnish et al. | 705/28 |

OTHER PUBLICATIONS

"Rezzer.tv—Affordable Format Conversion rezzer 1080i30 1080i rezer HD conversion video SD conversion HD pattern generator SD pattern generator HDTV, SDTV cross conversion", Feb. 25, 2008, pp. 1-4, http://www.4rfv.co.uk/fulllisting.asp?scategory=850.

* cited by examiner

*Primary Examiner* — Thai Tran
*Assistant Examiner* — Jose Mesa
(74) *Attorney, Agent, or Firm* — Yee & Associates, P.C.; Steven L. Bennett

(57) ABSTRACT

Improving storage efficiency for a digital video recorder is provided. It is determined whether television programming is being presented on a high definition channel or a standard definition channel. The television programming is recorded using the digital video recorder in response to determining that the television programming is being presented on a standard definition channel without making any resolution changes to the television programming. It is determined whether the content of the television programming originates in high definition or standard definition. When the television programming originates in standard definition, it is determined whether a corresponding standard definition channel is available. In response to determining the corresponding channel is available, the television programming is recorded in standard definition from the corresponding channel. Otherwise, the television programming is downscaled on the high definition channel to a standard definition resolution.

20 Claims, 3 Drawing Sheets

IMPROVING STORAGE EFFICIENCY OF HIGH DEFINITION DIGITAL VIDEO RECORDERS

BACKGROUND OF THE INVENTION

1. Field of the Invention

The present invention relates generally to a data processing system and in particular to an improved method and computer program product to improve storage efficiency on a media recorder. More specifically, the present invention relates to a method and apparatus for recording standard definition television programming on a high definition channel in standard definition resolution.

2. Description of the Related Art

Digital video recorders (DVRs) are used to record and present television programming and other media. Digital video recorders are capable of recording both high definition and standard definition channels. However, television programming that is recorded in a high definition resolution will occupy a greater percentage of storage space on a digital video recorder than television programming that is recorded in a standard definition resolution.

Television channels may be broadcast in either high definition or standard definition. Oftentimes, a high definition channel presents television programming originating from a standard definition format, but has been up-scaled to a high definition format. When a program which originates in standard definition is upscaled to high definition format, the improvements in picture quality are very minor, but the storage space required to keep the program on a DVR are similar to a program which originated as high definition. In fact, programs recorded in high definition format can take as much as 6 times the space as a program in standard definition format. The result is that a viewer must use greater storage space to keep a program (which was originally standard definition format, but upscaled to high definition), but does not benefit from the quality improvements that a high definition format provides. In order to store a greater percentage of television programming, a viewer instead may prefer to have the television programming, which was originally in standard definition format, recorded and presented in a standard definition resolution.

BRIEF SUMMARY OF THE INVENTION

The illustrative embodiments described herein provide a method and apparatus for improving storage efficiency for a digital video recorder. In one embodiment, the method comprises determining whether a television programming is being presented on a high definition channel or a standard definition channel. The television programming is recorded using the digital video recorder responsive to determining that the television programming is being presented on a standard definition channel without making any resolution changes to the television programming. Responsive to determining that the television programming is being presented on a high definition channel, a determination is made as to whether the content of the television programming originates in high definition or standard definition. Responsive to determining that the content of the television programming originates in standard definition, a determination is made as to whether a corresponding standard definition channel is available and presenting the same television programming. Responsive to determining the corresponding channel is available and presenting the television programming in standard definition, the television programming is recorded in standard definition from the corresponding channel. Responsive to an absence of the television programming being available on the standard definition channel, the television programming is downscaled on the high definition channel from a high definition resolution to a standard definition resolution. Responsive to downscaling the television programming on the high definition channel from the high definition resolution to the standard definition resolution, the television programming is recorded in the standard definition resolution.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
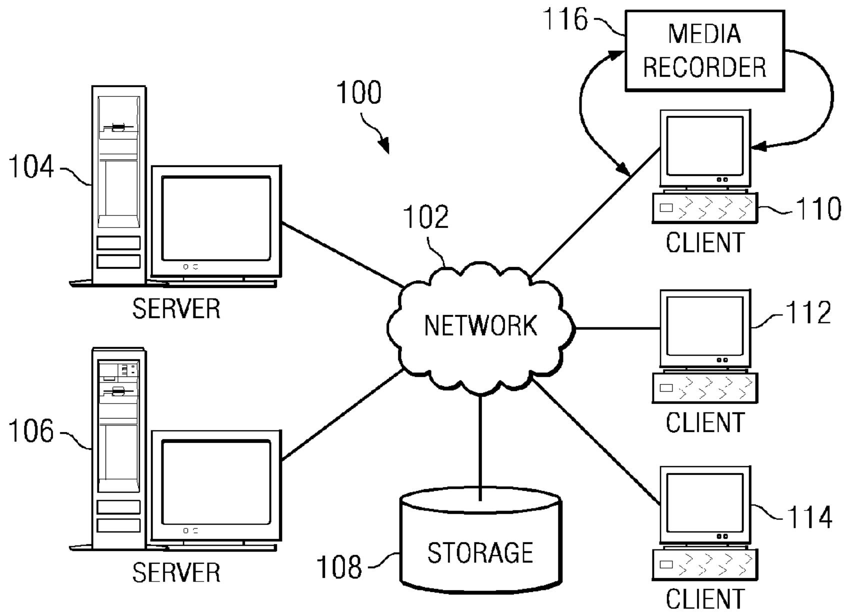
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Networked data processing system 100 is a network of computers in which the present invention may be implemented. Networked data processing system 100 contains network 102, which is the medium used to provide communications links between various devices and computers connected within networked data processing system 100. Network 102 may include permanent or temporary connections, and wireless or land line connections. In the depicted example, server 104 is connected to network 102, along with storage unit 106. In addition, clients 108, 110 and 112 are also connected to network 102. These clients, 108, 110 and 112, may be, for example, personal computers or network computers.

In the depicted example, server 104 provides data, such as boot files, operating system images and applications, to clients 108-112. Clients 108, 110 and 112 are clients to server 104. Networked data processing system 100 may include additional servers, clients, and other devices not shown. Networked data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

FIG. 1 includes media recorder 116, which may be used to implement the illustrated method for improving storage efficiency in a media recorder. Media recorder 116 may obtain signals for transmitting television programming from network 102. Media recorder 116 is an example of a media recorder similar to media recorder 302 as located herein in FIG. 3. Network 102 may also include cable networks that receive television programming on television channels through a cable network. In an alternative embodiment, network 102 may also receive the television channels through satellite broadcasting. In FIG. 1, network 102 transmits signals to media recorder 116 that provide television programming and television channels that a user may then view on a client device, such as client 110. Client 110 may include personal computers or televisions with audio-video output, which includes display device 306 displayed in FIG. 3. In an embodiment where media recorder 116 is connected to client 110, a user may view any television programming on client 110 that the user may have recorded on media recorder 116.

In the depicted example, networked data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, educational, and other computer systems that route data and messages. Of course, networked data processing system 100 also may be implemented as a number of different types of networks such as, for example, an Intranet or a local area network. FIG. 1 is intended as an example and not as an architectural limitation for the processes of the present invention.

Figure 2:
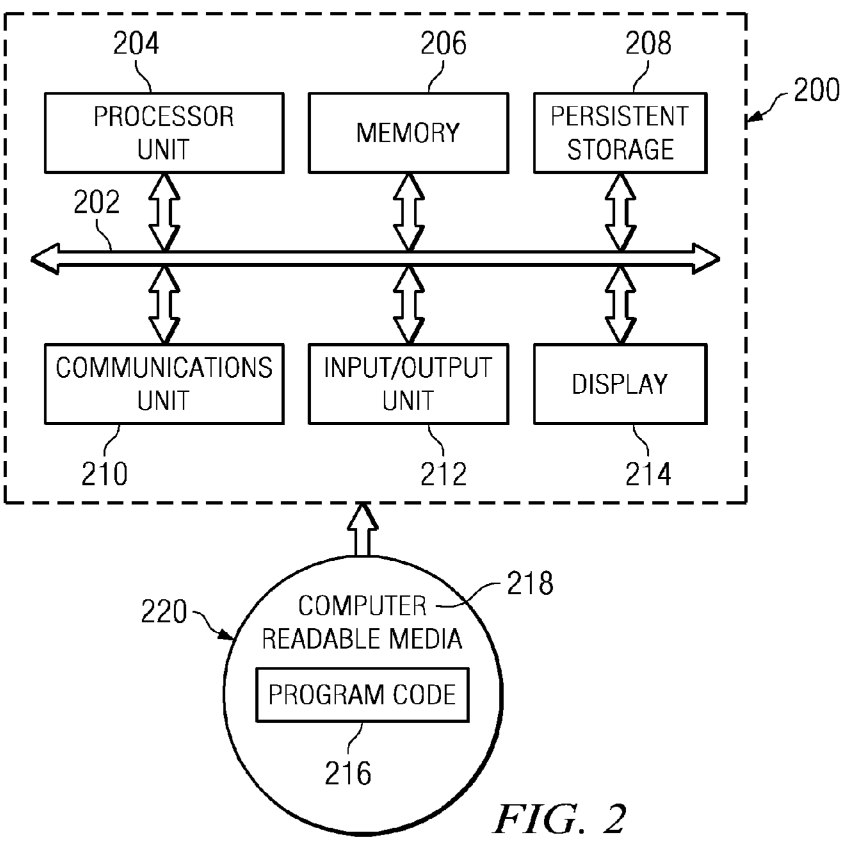
FIG. 2 is a block diagram of a data processing system in which illustrative embodiments may be implemented.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208 and computer readable media 218 are examples of storage devices in a tangible form. FIG. 2 may be used to implement client devices such as clients 110, 112, and 114 in FIG. 1. FIG. 2 may also be used to implement a media recorder, such as media recorder 302 in FIG. 3.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Media players or media recorders store and present television programming to viewers. Television programming may be presented in either a high definition channel resolution or a standard channel resolution. High definition television channels are often in demand, because viewers enjoy the enhanced image quality. However, if the original format of the program is standard definition, but upscaled to match the high definition format of the channel, and if the user would like to record their programming in such a way to save storage space in their media player, but not impact the video quality, the illustrative embodiments provide a method and apparatus for doing so. Thus, the illustrative embodiments recognize a need for a method for a media player that improves storage efficiency on a media player.

The illustrative embodiments described herein provide a method and apparatus for improving storage efficiency for a digital video recorder. In one embodiment, the method comprises determining whether a television programming is being presented on a high definition channel or a standard definition channel. The television programming is recorded using the digital video recorder responsive to determining that the television programming is being presented on a standard definition channel without making any resolution changes to the television programming. Responsive to determining that the television programming is being presented on a high definition channel, a determination is made whether the content of the television programming originates in high definition or standard definition. Responsive to determining that the content of the television programming originates in standard definition, a determination is made whether a corresponding standard definition channel is available and presenting the television programming. Responsive to determining that the corresponding channel is available and presenting the television programming in standard definition, the television programming is recorded in standard definition from the corresponding channel. Responsive to an absence of the television programming being available on the standard definition channel, the television programming is downscaled on the high definition channel from a high definition resolution to a standard definition resolution. Responsive to downscaling the television programming on the high definition channel from the high definition resolution to the standard definition resolution, the television programming is recorded in the standard definition resolution.

Figure 3:
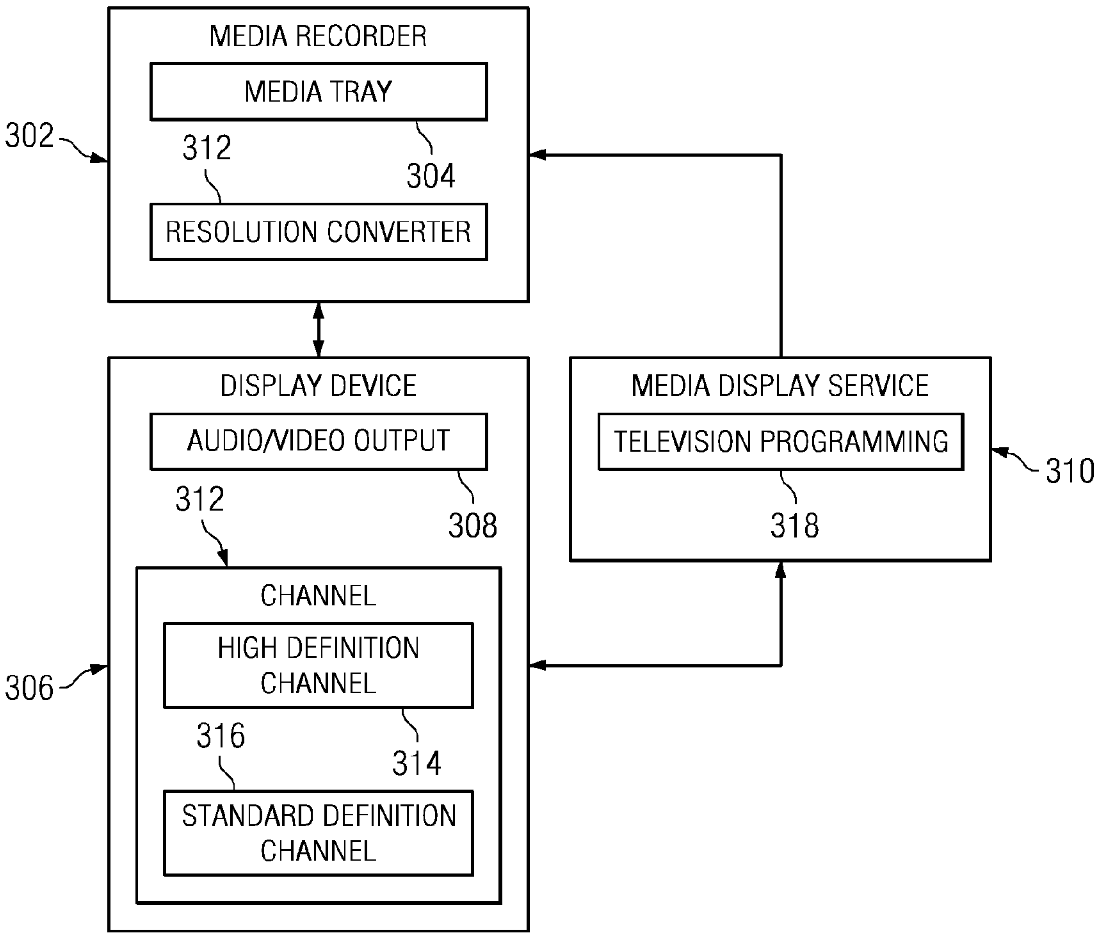
FIG. 3 is a block diagram of a media recorder with a resolution converter in accordance with an illustrative embodiment.

In FIG. 3, a block diagram of a media player is displayed with a resolution converter in accordance with an illustrative embodiment. Oftentimes, high definition channels take television programming from a source that is mastered or originates in standard definition. Then, the high definition channel upscales the resolution of the programming from standard resolution to a high definition resolution. After upscaling, the television programming is presented to viewers in a high definition format. However, since there is little video quality improvement on standard definition programming which is upscaled to high definition resolution, some viewers may prefer to record television programming in standard definition resolution. Such a recording will have virtually no degradation in video quality and offer a reduction in storage space. The illustrative embodiments provide a method and apparatus to assist in this process.

Display device 306 is also included in FIG. 3. Display device 306 includes audio/video output 308. Display device 306 may be comprised of, without limitation, television sets, personal computers including desktops or laptops, movie screens, or personal digital appliances (PDA's). Display device 306 includes audio/video output 308, wherein audiovisual material may be displayed to a viewer on display device 306.

Media recorder 302 is included in FIG. 3. Media recorder 302 may include, without limitation, digital video recorders (DVRs). Media recorder 302 may be a device that records audiovisual material, including television programming or other media. Media recorder 302 includes stand-alone set-top boxes, portable media players, and software for personal computers which enables video capture and playback to and from a disk. In another embodiment, media recorder 302 may also be included directly in a television, whereby the television contains digital video recording hardware and the corresponding software.

Media recorder 302 is capable of recording television programming 318. Television programming 318 is provided from media display service 310. Media display service 310 provides the cable or network connection to media that is recorded and presented by media player 302. Media display service 310 may be provided through a cable network, whereby television channels are presented through a cable network. Television channels may also be available via satellite television. Media display service 310 may be broadcast from various television, news, and cable stations, and includes both high-definition and standard definition resolution television programming.

Television programming 318 includes audiovisual material such as shows, news, songs, music videos, and other audiovisual material that has been prepared and recorded to be presented to a viewer on a television set. Television programming 318 appears to a viewer on channel 312. Channel 312 is located on display device 306. Channel 312 includes both high definition channel 314 and standard definition channels 316.

High definition channel 314 includes high definition television (HDTV) channels, which broadcast in a higher resolution than standard definition channels, such as standard definition channel 316. High definition channel 314 provides greater clarity in picture and sound to a viewer than standard definition channel 316. High definition television programming may often yield a better-quality image than standard television, because high-definition television has a greater number of lines of resolution. Standard-definition television (SDTV) refers to television systems that have a resolution that meets certain standards, but that are not considered to be either enhanced definition or high definition.

Media recorder 302 includes media tray 304. A viewer may insert a media disc into media tray 304 containing without limitation movies, music, or television programming. Media recorder 302 is capable of recording high definition television (HDTV) and standard definition television (SDTV).

Media recorder 302 additionally includes resolution converter 312. Resolution converter 312 may search for high definition channels that broadcast television programming in standard definition resolution. Additionally, resolution converter 312 may downscale television programming 318 from high definition resolution to standard definition resolution using known techniques in this field for downscaling from high definition resolution to standard definition resolution.

Resolution converter 312 may be used to determine whether television programming 318 is available in standard definition on a corresponding channel to a high definition channel. Many cable and satellite services provide both high definition and standard definition versions of the same television programming. For example, a news broadcast may be broadcast on one channel in standard definition and on another channel in high definition. Resolution converter 312 determines whether television programming 318 is available for recording on a corresponding channel in standard definition resolution. If there is a corresponding channel in standard definition resolution, then resolution converter 312 records the television program in standard definition resolution on the corresponding channel. Sometimes a television program may be presented at the same time on the standard resolution channel as a high definition resolution channel. The television program may also be presented at a later time than that of the high definition channel. In one embodiment, resolution converter 312 will record the television program at the scheduled time on the standard definition channel, even if the television program is presented at a later time than specified on the high definition channel. Thus, resolution converter 312 is able to record the television program on the standard definition channel at any time that the television program is available on that standard definition channel's schedule.

Importantly, a corresponding channel may not be available for presenting the same television program in standard definition. For such a situation, resolution converter 312 proceeds to downscale the television program from high definition resolution to standard definition resolution.

Resolution converter 312 may be either automatically activated in media recorder 302 or may be manually activated by a user specifically selecting an option to automatically save disk space on media player 302. This option may be presented on a display device, such as display device 306, as an "automatic disk space saver" option. The "automatic disk space saver" option may be selected by a user to set resolution converter 312 to automatically search for a standard definition resolution prior to recording television programming from a high definition channel. In a manual embodiment, when resolution converter 312 is not selected by a user, the method of determining the resolution of the television programming prior to recording the television programming would not be performed.

In one embodiment, media recorder 302 receives a selection from a viewer to record media provided through media display service 310, including without limitation, television programming 318. Media display service 310 provides television programming 318 to both media recorder 302 and to display device 306. Media recorder 302 is able to receive signals from display device 306 to record television programming 318 presented on display device 306.

As part of the preparation to record television programming 318, resolution converter 312 checks the description of the television programming to determine whether the program or show originates in high definition or standard definition. For example, HBO is a channel that viewers may subscribe to receive through cable or satellite broadcasting. HBO is available in both high definition resolution as HBO-HD and also in standard resolution as HBO. Resolution converter 312 makes a determination as to whether television programming 318 is displayed on high definition channel 314 or standard definition channel 316. If the source of the television programming is a standard definition channel, then resolution converter 312 records the television programming on the selected standard definition channel as broadcast.

If the channel is a high definition channel, then resolution converter 312 checks if the content of the television programming was originally created in standard definition. As previously discussed, high definition channels often take television programming that originate from a standard definition channel and upscale the programming from a standard definition resolution to a high definition resolution. Resolution converter 312 makes a determination as to whether such an event occurred to the television program that the viewer is seeking to record on media recorder 302.

After determining that the television programming originates from a standard definition format, resolution converter 312 determines whether a corresponding standard definition channel contains the same television programming displayed on a high definition channel. Resolution converter 312 is then able to record the television programming in standard definition from the standard definition channel.

If there is no corresponding standard definition channel, resolution converter 312 may also downscale the television programming on the high definition channel from a high definition resolution to a standard definition resolution. Downscaling a television programming implies converting the television programming from high definition resolution to a standard definition resolution. The techniques for doing so are known to one of ordinary skill in the art. After downscaling the television programming from a high definition resolution to a standard definition resolution, the television programming is recorded in the standard definition resolution.

Figure 4:
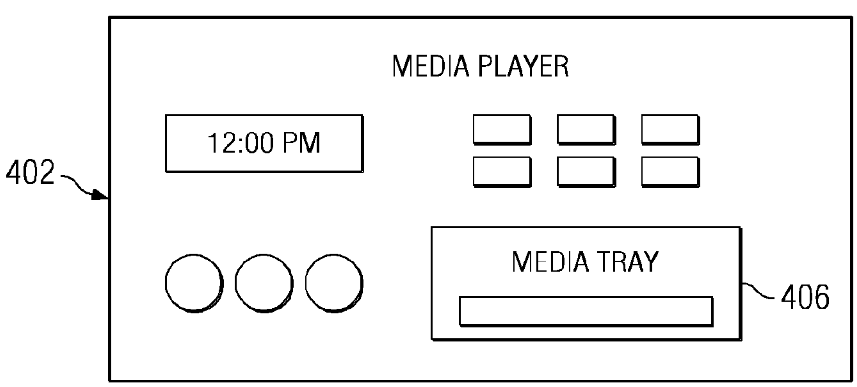
FIG. 4 is a diagram of a media recorder in accordance with an illustrative embodiment and FIG. 5 illustrates a process for recording television programming on a digital video recorder in accordance with an embodiment of the invention.

Referring to FIG. 4, a diagram of a media recorder is displayed in accordance with an illustrative embodiment. Media recorder 402 is included in FIG. 4. Media recorder 402 is a media recorder, such as media recorder 302 from FIG. 3. In one embodiment, media recorder 402 is a digital video recorder that focuses on multiple channels and is designed to allow simultaneous independent recording and playback. Media recorder 402 includes media tray 406 for inserting media storage discs, such as digital video devices (DVDs) or compact discs (CDs).

Figure 5:
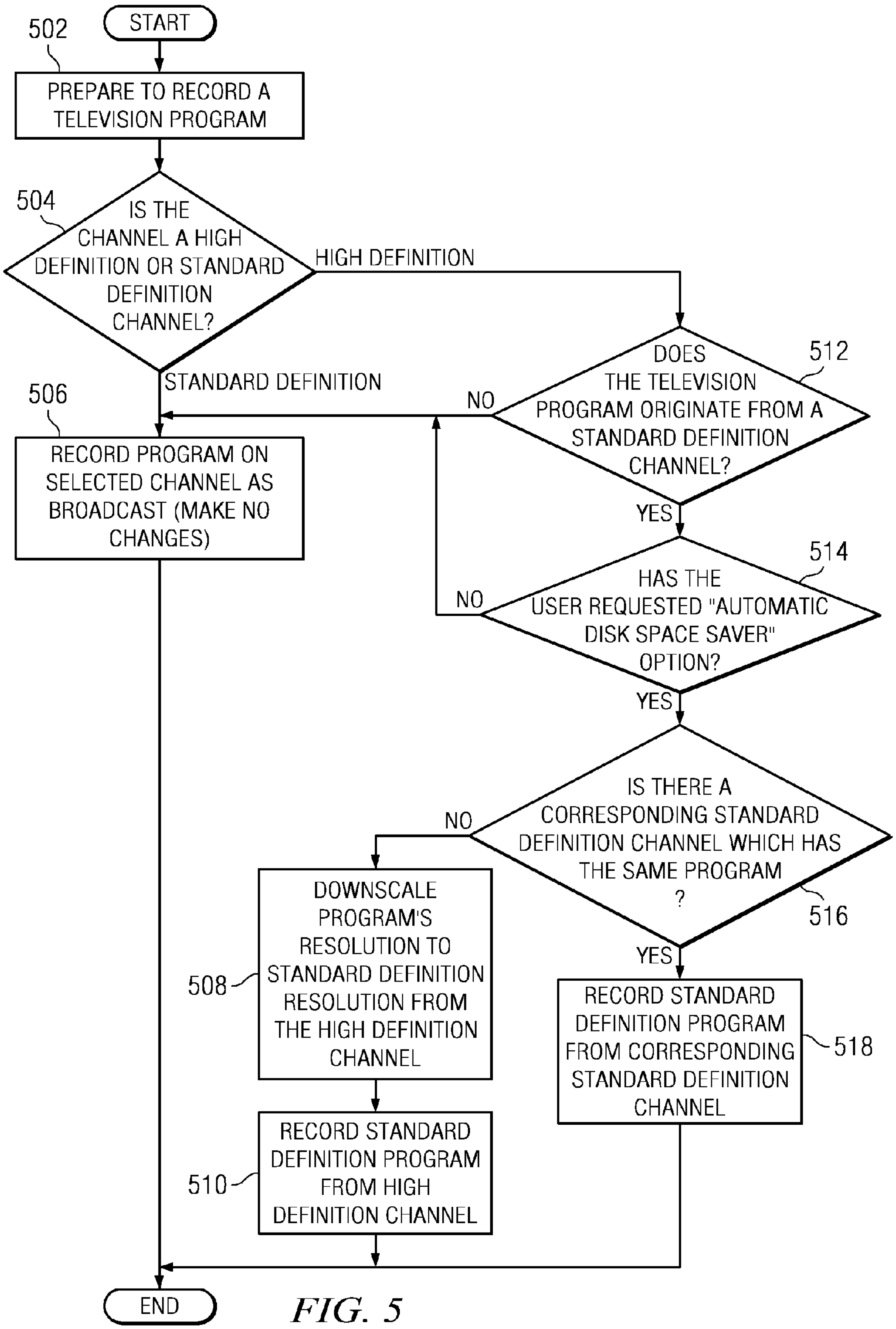

In FIG. 5, a process for recording television programming on a digital video recorder is depicted in accordance with an embodiment of the invention. The process is implemented in a digital video recorder used to record and playback media, such as media recorder 302 from FIG. 3 and media recorder 402 from FIG. 4.

The process begins by preparing to record a television program (step 502). A digital video recorder such as media recorder 302 in FIG. 3 records the television program. Next the process makes a query whether the channel is a high definition channel or a standard definition channel (step 504). If the channel is a standard definition channel, then the process records the program on the selected channel as broadcast without making any changes to the resolution of the program (step 506). The process terminates thereafter.

If the response to the query from step 504 is high definition, then the process makes a determination whether the television program originates from a standard definition format (step 512). If the process determines that the television program does not originate from a standard definition channel, then the process proceeds to downscale the program's resolution to standard definition resolution from the high definition channel (step 508) and the process terminates thereafter.

However, if the response is yes, then the process queries whether the user has requested the "automatic disk space saver" option (step 514). If the answer to the query regarding the "automatic disk space saver" option is no, then the process proceeds to record the program on the selected channel as broadcast (step 506) and the process terminates thereafter.

If a user has requested the "automatic disk space saver" option, then the process proceeds to determine whether there is a corresponding standard definition channel which has the same program (step 516) If there is a corresponding standard definition channel with the same program, then the process records the standard definition program from corresponding standard definition channel (step 518). The process terminates thereafter.

If the television program does not originate from a standard definition channel at step 512, then the process proceeds to downscale the program's resolution to standard definition resolution from the high definition channel (step 508). The process then proceeds to record the standard definition program from the high definition channel (step 510). The process terminates thereafter.

Additionally, if at step 516, a corresponding channel is unavailable, then the process also downscales the program's resolution to standard definition resolution from the high definition channel (step 508). The process then records the standard definition program from the high definition channel (step 510). The process terminates thereafter.

High definition channels require significantly more disk space than standard definition channels because of the great number of pixels per frame. Some estimates locate high definition resolution as having at least six times the number of pixels as standard definition resolution. Unnecessary disk space is wasted since digital video recorders may end up recording television programming in high definition even though the same television programming is available in standard definition. Thus, the illustrative embodiments improve storage efficiency on high definition digital video recorders without impacting video quality.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the illustrative embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present illustrative embodiments have been presented for purposes of illustration and description, but is not intended to be exhaustive or limited to the illustrative embodiments in the form disclosed. Many modifications and variations will be apparent to those of ordinary skill in the art without departing from the scope and spirit of the illustrative embodiments. The embodiment was chosen and described in order to best explain the principles of the illustrative embodiments and the practical application, and to enable others of ordinary skill in the art to understand the illustrative embodiments for various embodiments with various modifications as are suited to the particular use contemplated.

The illustrative embodiments can take the form of an entirely hardware embodiment, an entirely software embodiment or an embodiment containing both hardware and software elements. In a preferred embodiment, the illustrative embodiments are implemented in software, which includes but is not limited to firmware, resident software, microcode, etc.

Furthermore, the illustrative embodiments can take the form of a computer program product accessible from a recordable type computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A method for improving storage efficiency for a digital video recorder, the method comprising:

responsive to the digital video recorder preparing to record a television programming, determining, by the digital video recorder, whether the television programming is being presented on a high definition channel;

responsive to the digital video recorder determining that the television programming is being presented on a high definition channel, determining, by the digital video recorder, whether content of the television programming being presented on the high definition channel originates from a standard definition channel;

responsive to the digital video recorder determining that the content of the television programming being presented on the high definition channel originates from a standard definition channel, determining, by the digital video recorder, whether an automatic disc saver option to record the content of the television programming is selected;

responsive to the digital video recorder determining that an automatic disc saver option to record the content of the television programming is selected, determining, by the digital video recorder, whether a corresponding standard definition channel to the high definition channel is available to record the content of the television programming from;

responsive to the digital video recorder determining that a corresponding standard definition channel to the high definition channel is available to record the content of the television programming from, recording, by the digital video recorder, the content of the television programming in a standard definition resolution from the corresponding standard definition channel;

responsive to the digital video recorder determining that the content of the television programming is not available on a corresponding standard definition channel, downscaling, by the digital video recorder, the content of the television programming being presented on the high definition channel from a high definition resolution to the standard definition resolution; and responsive to the digital video recorder downscaling the content of the television programming presented on the high definition channel from the high definition resolution to the standard definition resolution, recording, by the digital video recorder, the content of the television programming in the standard definition resolution.

2. The method of claim 1, further comprising:

verifying, by the digital video recorder, a user selection to automatically save disk space on the digital video recorder.

3. The method of claim 1, wherein the content of the television programming is recorded from the corresponding standard definition channel according to a presentation schedule for the television programming on the corresponding standard definition channel.

4. The method of claim 1, wherein the high definition resolution requires greater storage space than the standard definition resolution on the digital video recorder.

5. The method of claim 1, wherein the digital video recorder comprises a high definition digital video recorder.

6. The method of claim 1, wherein the digital video recorder is able to record the content of the television programming from both standard definition channels and high definition channels.

7. A computer program product stored on a computer readable storage device having computer usable program code embodied there on that is executable by a digital video recorder for improving storage efficiency for the digital video recorder, the computer program product comprising:

computer useable program code, responsive to preparing to record a television programming, for determining whether the television programming is being presented on a high definition channel;

computer useable program code, responsive to determining that the television programming is being presented on a high definition channel, for determining whether content of the television programming being presented on the high definition channel originates from a standard definition channel;

computer useable program code, responsive to determining that the content of the television programming being presented on the high definition channel originates from a standard definition channel, for determining whether an automatic disc saver option to record the content of the television programming is selected;

computer useable program code, responsive to determining that an automatic disc saver option to record the content of the television programming is selected, for determining whether a corresponding standard definition channel to the high definition channel is available to record the content of the television programming from;

computer useable program code, responsive to determining that a corresponding standard definition channel to the high definition channel is available to record the content of the television programming from, for recording the content of the television programming in a standard definition resolution from the corresponding standard definition channel;

computer useable program code, responsive to determining that the content of the television programming is not available on a corresponding standard definition channel, for downscaling the content of the television programming being presented on the high definition channel from a high definition resolution to the standard definition resolution; and computer useable program code, responsive to downscaling the content of the television programming being presented on the high definition channel from the high definition resolution to the standard definition resolution, for recording the content of the television programming in the standard definition resolution.

8. The computer program product of claim 7, further comprising:

computer useable program code for verifying a user selection to automatically save disk space on the digital video recorder.

9. The computer program product of claim 7, wherein the content of the television programming is recorded from the corresponding standard definition channel according to a presentation schedule for the television programming on the corresponding standard definition channel.

10. The computer program product of claim 7, wherein the high definition resolution requires greater storage space than the standard definition resolution on the digital video recorder.

11. The computer program product of claim 7, wherein the digital video recorder comprises a high definition digital video recorder.

12. The computer program product of claim 7, wherein the digital video recorder is able to record the content of the television programming from both standard definition channels and high definition channels.

13. A digital video recorder, the digital video recorder comprising:

a bus system;

a storage device connected to the bus system, wherein computer usable program code is stored on the storage device; and a processing unit connected to the bus system, wherein the processing unit executes the computer usable program code to:

determine whether a television programming is being presented on a high definition channel in response to preparing to record the television programming;

determine whether content of the television programming being presented on the high definition channel originates from a standard definition channel in response to determining that the television programming is being presented on a high definition channel;

determine whether an automatic disc saver option to record the content of the television programming is selected in response to determining that the content of the television programming being presented on the high definition channel originates from a standard definition channel;

determine whether a corresponding standard definition channel to the high definition channel is available to record the content of the television programming from in response to determining that an automatic disc saver option to record the content of the television programming is selected;

record the content of the television programming in a standard definition resolution from the corresponding standard definition channel in response to determining that a corresponding standard definition channel is available to record the content of the television programming from;

downscale the content of the television programming being presented on the high definition channel from a high definition resolution to the standard definition resolution in response to determining that the content of the television programming is not available on a corresponding standard definition channel; and record the content of the television programming in the standard definition resolution in response to downscaling the content of the television programming being presented on the high definition channel from the high definition resolution to the standard definition resolution.

14. The digital video recorder of claim 13, wherein the processing unit further executes the computer usable program code to verify a user selection to automatically save disk space on the digital video recorder.

15. The digital video recorder of claim 13, wherein the content of the television programming is recorded from the corresponding standard definition channel according to a presentation schedule for the television programming on the corresponding standard definition channel.

16. The digital video recorder of claim 13, wherein the high definition resolution requires greater storage space than the standard definition resolution on the digital video recorder.

17. The digital video recorder of claim 13, wherein the digital video recorder comprises a high definition digital video recorder.

18. The method of claim 1, further comprising:

responsive to the digital video recorder determining that the content of the television programming is being presented on a standard definition channel, recording by the digital video recorder the content of the television programming from the standard definition channel without making any resolution changes to the content of the television programming.

19. The computer program product of claim 7, further comprising:

computer useable program code, responsive to determining that the content of the television programming is being presented on a standard definition channel, for recording the content of the television programming from the standard definition channel without making any resolution changes to the content of the television programming.

20. The digital video recorder of claim 13, wherein the processing unit further executes the computer usable program code to record the content of the television programming from a standard definition channel without making any resolution changes to the content of the television programming in response to determining that the content of the television programming is being presented on the standard definition channel.

* * * * *